(12) United States Patent
Baxter et al.

(10) Patent No.: US 9,041,708 B2
(45) Date of Patent: May 26, 2015

(54) MULTIPLE VIEWSHED ANALYSIS

(71) Applicant: Palantir Technologies, Inc., Palo Alto, CA (US)

(72) Inventors: Jay Baxter, Hillsborough, CA (US); Vineet Gopal, Plano, TX (US); David Skiff, Redwood City, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 13/948,859

(22) Filed: Jul. 23, 2013

(65) Prior Publication Data

US 2015/0029176 A1   Jan. 29, 2015

(51) Int. Cl.
| | | |
|---|---|---|
| G06T 15/00 | (2011.01) | |
| G06T 17/00 | (2006.01) | |
| G06K 9/00 | (2006.01) | |
| G08G 1/123 | (2006.01) | |

(52) U.S. Cl.
CPC ...................................... *G06T 15/00* (2013.01)

(58) Field of Classification Search
CPC ............................... G06T 17/05; G06T 15/06
See application file for complete search history.

(56) References Cited

U.S. PATENT DOCUMENTS

| | | | |
|---|---|---|---|
| 6,173,067 B1 | 1/2001 | Payton et al. | |
| 8,325,178 B1 | 12/2012 | Doyle, Jr. | |
| 8,400,448 B1 | 3/2013 | Doyle, Jr. | |
| 8,422,825 B1* | 4/2013 | Neophytou et al. | 382/294 |
| 2005/0267652 A1 | 12/2005 | Allstadt et al. | |
| 2010/0106420 A1 | 4/2010 | Mattikalli et al. | |
| 2011/0069145 A1* | 3/2011 | Weber et al. | 348/36 |
| 2013/0021445 A1* | 1/2013 | Cossette-Pacheco et al. | 348/46 |

FOREIGN PATENT DOCUMENTS

| | | |
|---|---|---|
| WO | WO 2004/057268 | 7/2004 |
| WO | WO 2009/123975 | 10/2009 |
| WO | WO2011/058507 | 5/2011 |

OTHER PUBLICATIONS

Steve Carver and Justin Washtell, "Real-time visibility analysis and rapid viewshed calculation using a voxelbased modelling approach", GISRUK 2012 Conference, Apr. 11 to 13, Lancaster, UK, Apr. 13, 2012.*
Fang Qiu, "3D Analysis and Surface Modeling ", http://web.archive.org/web/20091202221925/http://www.utsa.edu/Irsg/Teaching/EES6513/08-3D.pdf, available since Dec. 2, 2009.*
Diane Barnes & Rachel Rounds, "Viewshed Analysis", GIS—ARC/INFO 2001, www.evsc.virginia.edu/~jhp7e/evsc466/student_pres/Rounds.pdf, available in web since Aug. 27, 2002.*
New Zealand Intellectual Property Office, "First Examination Report" in application No. 616167, dated Oct. 10, 2013, 3 pages.
Current Claims in application No. 616167, dated Oct. 2013, 3 pages.
Intellectual Property Office of London, "Search Report" in application No. GB1319225.7, dated May 2, 2014, 4 pages.
Current Claims in appplication No. GB1319225.7, dated May 2014, 3 pages.

\* cited by examiner

*Primary Examiner* — Tize Ma
(74) *Attorney, Agent, or Firm* — Hickman Palermo Becker Bingham LLP

(57) ABSTRACT

Viewshed intersection analysis and usage is disclosed. A plurality of object positions is obtained. Each object position is associated with a range. A relevant area is determined. Elevation data is obtained for a plurality of points in the relevant area. Lines of sight are evaluated between the plurality of points and the object positions within the associated ranges based on the elevation data. An interest zone comprising a subset of the plurality of points within the relevant area is determined.

20 Claims, 9 Drawing Sheets

MULTIPLE VIEWSHED ANALYSIS

FIELD OF THE DISCLOSURE

The present disclosure relates to topographical data analysis. The disclosure relates more specifically to computer-implemented techniques for multiple viewshed analysis.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A viewshed is an area that is visible from a fixed point of view. In computer-based map displays, a viewshed can comprise a region of the map that is visible from a particular point. A digital elevation model may be created and stored in computer-based map systems and contains elevation data for cells within a region. In standard viewshed analysis, the digital elevation model is used to determine whether a clear line of sight exists between a viewpoint cell and other target cells within the region. If a cell with a higher elevation value lies between the viewpoint cell and a target cell, then the line of sight is blocked, and the target cell is omitted from the viewshed of the viewshed cell.

Viewshed analysis for an object may be used to evaluate areas from which the object is visible, as well as to evaluate areas that are observable from the object.

Usage of a single viewshed has military and civilian applications. For example, a viewshed may be used to evaluate coverage of an existing or potential tower site, such as a radio tower, watchtower or observation point. Furthermore, viewsheds may be used for urban planning, such as to maintain the visibility of a landmark, and to evaluate the visibility of an existing or proposed building.

SUMMARY

The appended claims may serve as a summary of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings.

DETAILED DESCRIPTION

Figure 1:
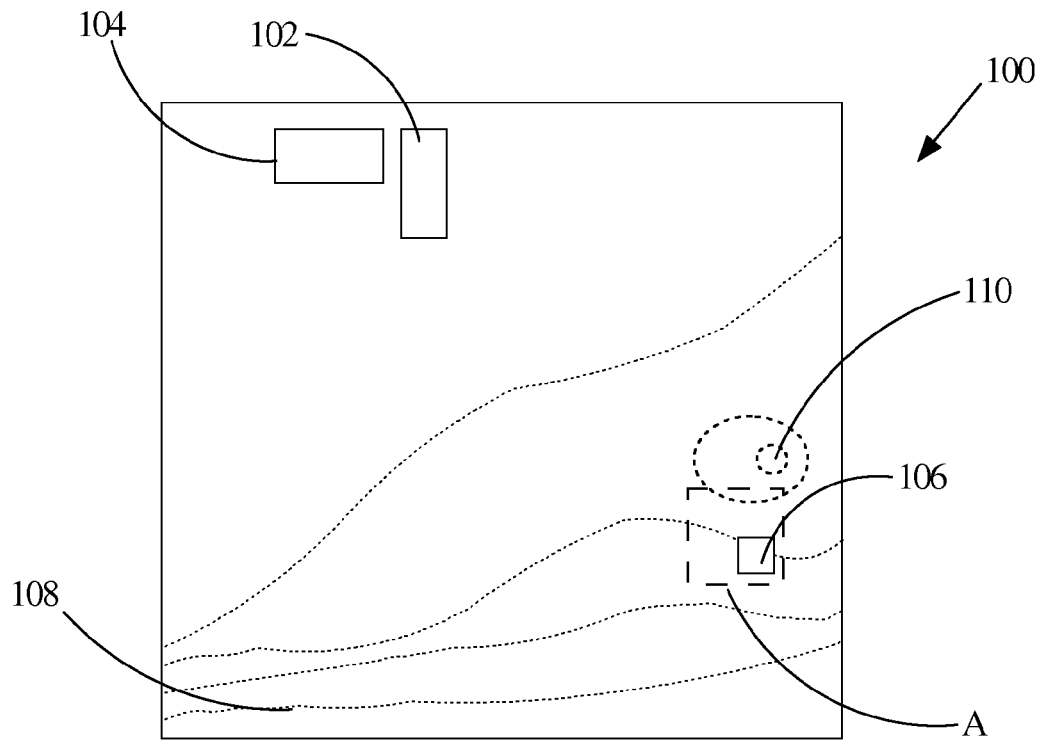
FIG. 1 illustrates an embodiment of an area containing features related to elevation data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1. General Overview
2. Elevation Data
3. Object Data
4. Interest Zone Calculations
5. Visualization
6. Hardware Overview

1. General Overview

Computer-implemented systems and methods are provided for multiple viewshed analysis. In an embodiment, a plurality of object positions is obtained. The object positions correspond to positions of events, individuals, vehicles, structures, devices, sites or other viable objects. Each object position is associated with a range.

As used herein, the term "viewshed" refers to an area that is visible from a specific location. A viewshed for an object position may be determined using elevation data. The elevation data is used to evaluate a line of sight between an object position and points that are within a range of the object position. Points that are visible from the object position are in the viewshed of the object position.

Multiple viewshed analysis is performed over a relevant area containing the object positions. Elevation data is obtained for a plurality of points in a relevant area. An interest zone is determined by evaluating lines of sight between the object positions and the plurality of points in the relevant area that are within range of the object positions.

The interest zone includes a subset of the points in the relevant area. In one embodiment, the interest zone is defined such that a clear line of sight exists between the interest zone and each of the object positions within the associated ranges. In one embodiment, this type of interest zone is used to determine a common cause, perpetrator, or other linkage between the objects associated with the object positions.

In another embodiment, the interest zone is defined such that no line of sight is clear between the interest zone and any of the object positions within the associated ranges.

Computer-implemented systems and methods are also provided relating to user interfaces for performing multiple viewshed analysis and viewing multiple viewshed analysis results. A graphical user interface may be provided to facilitate object input. Mapping tools may also be provided to facilitate multiple viewshed analysis. A three-dimensional navigable map may be rendered to display the interest zone in the context of the elevation data.

2. Elevation Data

Multiple viewshed analysis may be performed over a relevant area containing one or more object positions associated with objects of interest. The relevant area may include every point within the range of one or more object positions. Alternatively or in addition, the relevant area may include points outside the range of any object position. The relevant area may also exclude points within the range of any object position.

To perform multiple viewshed analysis over a region, elevation data for the region is required. Elevation data is obtained for a plurality of points in a relevant area. FIG. 1 illustrates an example area containing features related to elevation data that may be useful in describing an embodiment of computer-implemented techniques for multiple viewshed analysis. View 100 is a top plan view of a region containing a plurality of features 102-110 that may be represented in the elevation data. Features 102-110 may include human-made features 102-106, terrain features 108-110, or any combination thereof.

Elevation data may be stored in one or more data sources. In one embodiment, elevation data used for multiple viewshed analysis is generated by combining elevation and/or height data from multiple sources. For example, data associated with a feature may be used to modify elevation data from another data source, such as when the elevation data from the other source does not reflect the feature. The elevation data may already include elevation information about one or more features. Public map data sources may be used as a starting point.

Man-made features 102, 104, 106 may include any man-made structure, such as buildings, towers, walls, roads, bridges, platforms, water-borne structures, air-borne structures, and any other man-made structure. Man-made features 102-106 may be fixed to land and/or water. Alternatively or in addition, man-made features 102-106 may be semi-mobile or fully mobile. In one embodiment, elevation data for man-made features 102-106 includes height data for features located at fixed positions. Alternatively or in addition, elevation data for man-made features may include height data and/or other dimensions that may be used with position and/or orientation data to generate elevation data for multiple viewshed analysis.

Terrain features 108-110 may include any geological and/or natural feature, such as mountains, cliffs, hills, plains, valleys, water body surfaces, and/or any other geological or topographical feature.

Data associated with features 102-110 may be obtained from one or more databases. Although distinctions are made between man-made features 102-106 entering features 108-110, one or more databases containing data associated with features 102-110 may include both man-made features 102-106 and terrain features 108-110. Alternatively or in addition, elevation data associated with different feature types may be obtained from different databases.

One or more of features 102-110 may possess characteristic that may be classified as either man-made or terrain, such as an excavation site, a quarry, a dam, or any other man-made modification to natural terrain.

Figure 2:
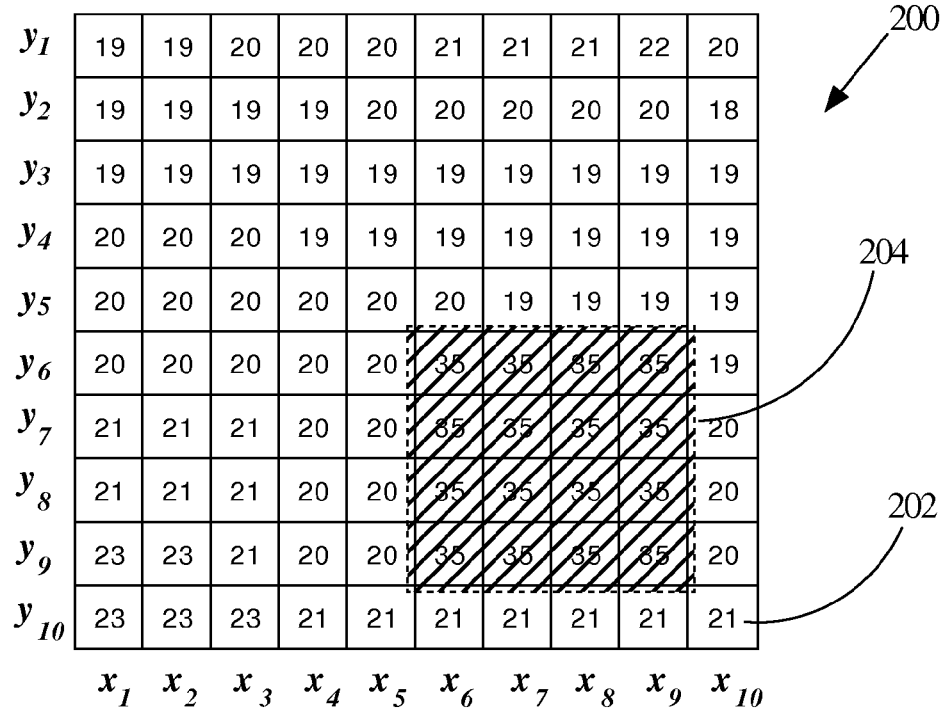
FIG. 2 illustrates an embodiment of elevation data.

FIG. 2 illustrates a partial example of elevation data that may be useful in describing an embodiment of computer-implemented techniques for multiple viewshed analysis. In the example of FIG. 2, example elevation data 200 corresponds to region A of FIG. 1. Elevation data 200 includes elevation values 202 for a plurality of points (x, y) in region A of FIG. 1. Although the notation (x, y, z) may be used herein to refer to a specific coordinate (x, y) with an elevation of z, storing (x, y) and z in a data structure for a three-dimensional data point is not required and any suitable storage format may be used. Although elevation data 200 is illustrated as a 2-dimensional array for convenience, elevation data 200 may be stored using any representation suitable for storing elevation data.

In one embodiment, the position of an object and points corresponding to other positions are defined in a geographic coordinate system, such as latitude and longitude values based on any geodetic system or datum, the Military Grid Reference System (MGRS), the Universal Transverse Mercator (UTM) grid system, the Universal Polar Stereographic (UPS) grid system, or any combination thereof.

Elevation values 202 specify the elevation at a point (x, y). In some geographic coordinate systems, elevation values 202 are included in geographic coordinates. Elevation values 202 may be specified in any unit based on any reference. For example, one common reference point for elevation data is sea level. Alternatively or in addition, elevation values maybe expressed relative to a point within a specific map datum that holds a known, fixed value.

Elevation data 200 may be obtained from one or more databases. The elevation data obtained from a database may already include data associated with one or more features. For example, the slope associated with terrain feature 108 is reflected in the unshaded portion of elevation data 200.

Data associated with one or more features may be used to modify elevation data, such as when the elevation data does not reflect a feature. For example, the shaded portion 204 of elevation data 200 contains elevation values that are modified to reflect the dimensions of the structure associated with man-made feature 106.

3. Object Data

Multiple viewshed analysis is performed by computer analysis of lines of sight between points in a relevant area and multiple object positions. The object positions may correspond to positions of objects such as events, individuals, vehicles, structures, devices, sites or other viable objects. In one embodiment, one or more objects correspond to observation points, such as an existing or a potential lookout, position of personnel, positions of vehicles or things, device installation, structure, or other site. Alternatively or in addition, one or more objects may correspond to observed events, such as a shooting, an explosion, an attack, a photograph, a communication, a video, a report, or any other observable event.

Figure 3:
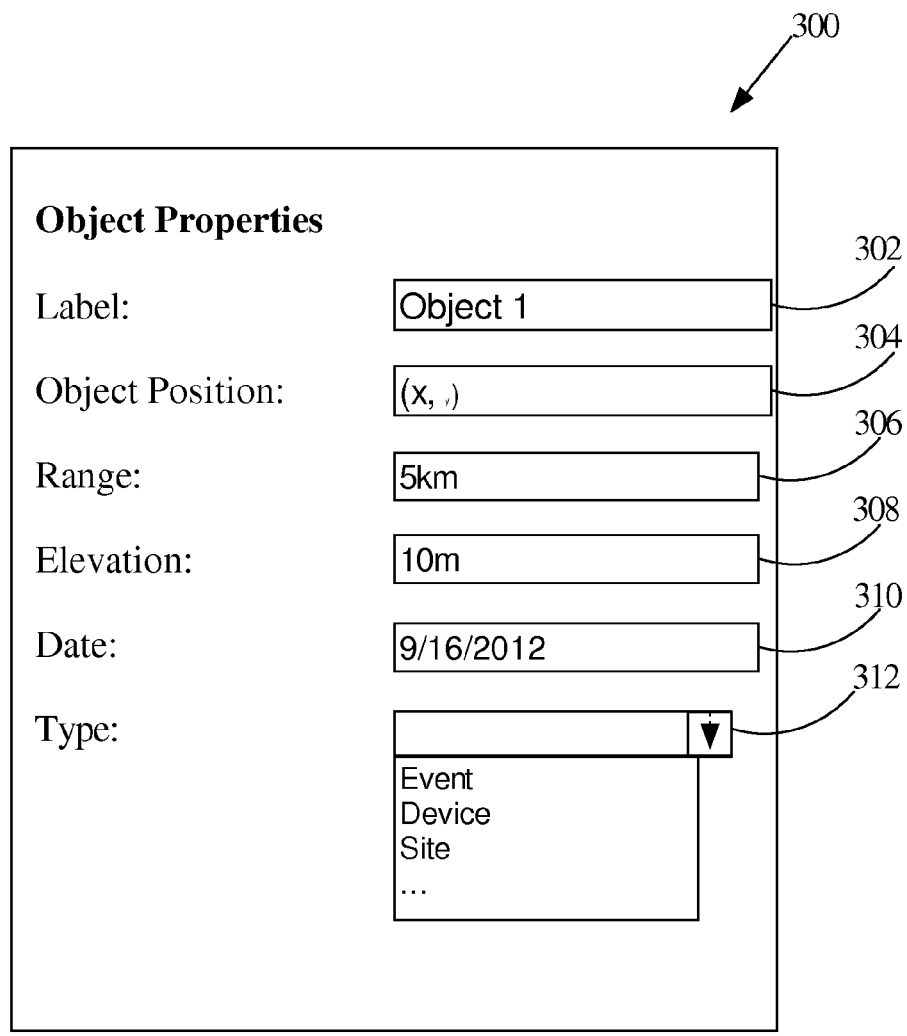
FIG. 3 illustrates an embodiment of a user interface for entering object information.

Object information may be obtained from a data source, such as a database, file, data stream, or any other source of object information. Public databases may be used. Private databases may be used, including but not limited to the type of data repository used in Palantir Gotham, commercially available from Palantir Technologies, Inc., Palo Alto, Calif. In one embodiment, object information is entered by a user via a user interface. FIG. 3 illustrates an embodiment of a user interface for entering object information.

User interface 300 is configured to display and/or allow input of one or more elements corresponding to a property of an object. User interface 300 includes name element 302. Name element 302 allows a user to enter an identifier for an object. User interface 300 further includes position element 304. Position element 304 allows a user to associate a position with the object. In one embodiment, the position is a geographic coordinate in any geographic coordinate system. In one embodiment, position element 304 may allow a user to enter a geographic coordinate through a map interface, a geographic search interface, or any other interface configured to assist the user in associating a position with the object. For example, user interface 300 may be displayed after a location is selected on a map such that the position of the selected location is displayed in position element 304.

User interface 300 further includes range element 306. Range element 306 allows a user to associate a range with the object. In one embodiment, the range of an object position is defined by a radius from the object position. The range may also be specified by one or more other formulas, curves, polygons, lines, edges, or any other method suitable for defining a range of the object position. In the case of a range defined by a radius, points within the radius are evaluated to determine if there is a clear line of sight between a specific point and the object position.

Points within range of the object position may be determined based on a two-dimensional distance calculation or a three-dimensional distance calculation. For example, for an object position (x, y, z) with a range of 1000, a point (x, y+1000, z) may be included based on both a two-dimensional distance calculation and a three-dimensional distance calculation, while a point (x, y+1000, z+1000) may be included based on a two-dimensional distance calculation but excluded based on a three-dimensional distance calculation.

In one embodiment, range element 306 includes a horizontal viewing angle restriction and/or a vertical viewing angle restriction to associate with an object. A default horizontal viewing angle restriction and/or a default vertical viewing angle restriction may be supplied for one or more object types. In one embodiment, one or more object types are associated with no viewing angle restrictions by default.

In one embodiment, the range is determined based on an object type. For example, if the object corresponds to unaided human vision, a default value for the range may be determined based on the range of human sight. If the object corresponds to an imaging device, a default value for the range may be determined based on the range of the device, including any horizontal viewing angle restriction and/or vertical viewing angle restriction. Alternatively or in addition, the range may be determined and/or modified based on one or more local conditions, such as weather, pollution, humidity, and/or any local condition that may affect visibility. In one embodiment, the local condition is determined based on a time associated with the object.

User interface 300 further includes elevation element 308. Elevation element 308 allows a user to associate an elevation value with the object. In one embodiment, the elevation value associated with the object may be a value relative to the elevation of the object position. Alternatively or in addition, the elevation value associated with the object may be a value that includes the elevation of the object position. For example, if the object is a 10 m tall tower and the object position of the object has an elevation of 100 m above sea level, the appropriate elevation value of the object may be 10 m (relative to the object position) or 110 m (relative to sea level). A default elevation value may be supplied for elevation element 308. In one embodiment, a default elevation value of an object is 0 relative to the object position.

User interface 300 further includes time element 310. Time element 310 allows a user to associate time information with the object. The time information associated with the object may include time, time zone, and/or date information. In one embodiment, partial time information may be entered. For example, a user may specify through time element 310 that the object is associated with either daytime or nighttime. The time information associated with the object may be used to determine a default value for the range associated with the device. For example, the time information may be used to determine one or more local conditions, such as natural lighting conditions, weather, pollution, humidity, or any other local condition at the time associated with the object.

User interface 300 further includes type element 312. Type element 312 allows a user to associate an object classification the object. Object classifications may be used to indicate that an object is an event, individual, vehicle, structure, device, site, or any other type of object. An object classification may be associated with one or more default values for one or more object properties. The object classification may include one or more subclass levels arranged in a hierarchy.

4. Interest Zone Calculation

Multiple viewshed analysis is performed over the relevant area to determine an interest zone. The interest zone is determined by evaluating lines of sight between the object positions and the plurality of points in the relevant area that are within range of the object positions. The analysis is computer-based analysis using one or more computer programs, other software elements, or other logic, with a general-purpose computer or special-purpose computer, and the interest zone may be created and used based on transforming data values in electronic digital memory.

The interest zone may be used for purposes such as determining a likely location of a source associated with the objects. For example, the objects may correspond to attack events, including sniper attacks, improvised explosive device (IED) detonations, and other attacks or explosions. The analysis may yield the likely position of a source of the attack events, such as a sniper location, a lookout point, or another source of the attacks. The analysis may also yield information on coverage and concealment, including information that may be used for location, route and operation planning.

Figure 4:
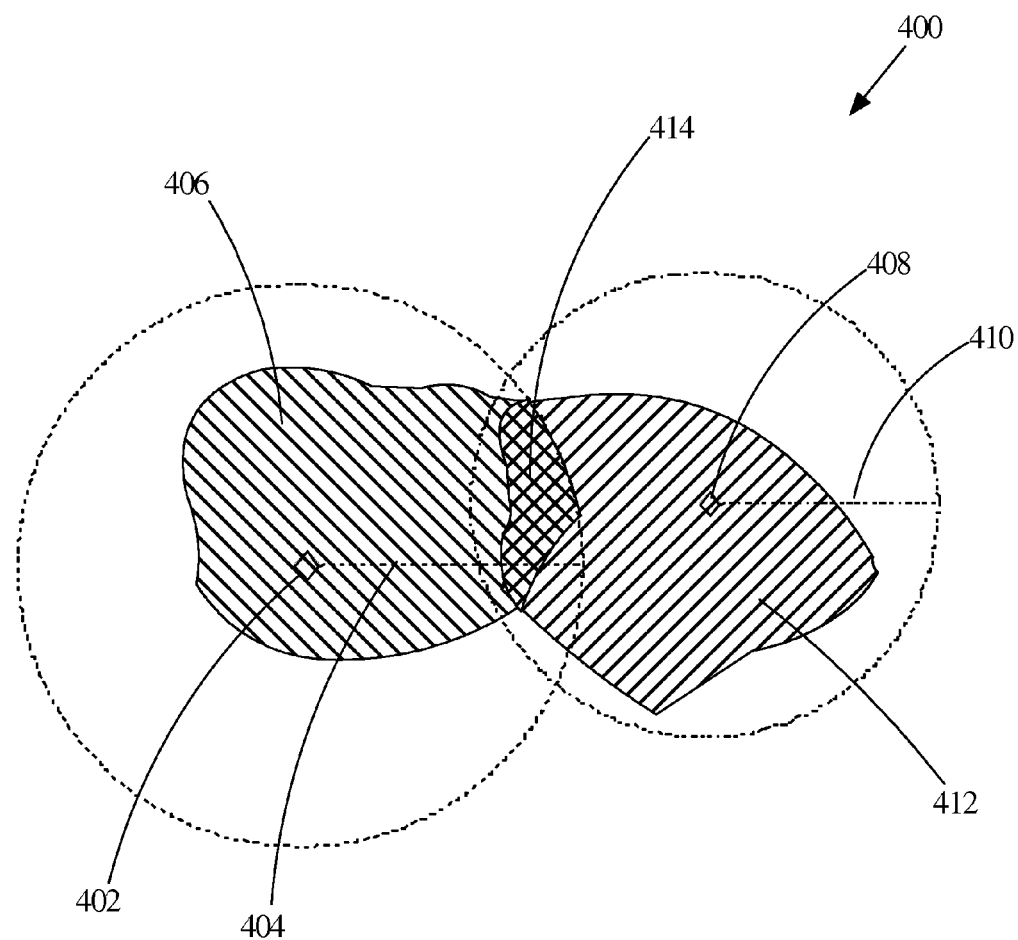
FIG. 4 illustrates an embodiment of an interest zone with a clear line of sight to multiple objects.

FIG. 4 illustrates an embodiment of an interest zone with a clear line of sight to multiple objects. In one embodiment, the interest zone is defined such that a clear line of sight exists between the interest zone and each of the object positions within the associated ranges. In one embodiment, this type of interest zone is used to determine a common cause, perpetrator, or other linkage between the objects associated with the object positions.

Two objects are located within relevant area 400. The first object is associated with object position 402 and range 404. The second object is associated with object position 408 and range 410. Viewshed 406 is a viewshed associated with the first object and includes all points with a clear line of sight from object position 402 within range 404. Viewshed 408 is a viewshed associated with the second object and includes all points with a clear line of sight from object position 408 within range 410.

Interest zone 414 includes all points in relevant area 400 with a clear line of sight both to object position 402 and object position 408. In one embodiment, interest zone 414 is calculated based on an intersection of viewshed 406 and viewshed 412. A viewshed is generated by evaluating the line of sight between the object position and all points within range based on elevation information for points lying between the object position and any specific point. Viewshed 406 and viewshed 412 may be calculated separately before an intersection operation is performed. Alternatively or in addition, when the interest zone 414 requires visibility from all specified objects, calculation may be restricted to points within range of all object positions.

In one embodiment, interest zone 414 is calculated based on a binary value for visibility. When a binary value for visibility is used, the line of sight between a first point and a second point is either visible or not. A binary value for visibility may be appropriate for visibility and/or imaging in the visible light spectrum or near-visible light spectrum. Visibility may also be represented using probabilistic values, such as when evaluating the visibility of longer electromagnetic waves such as radio waves.

In one embodiment, interest zone 414 is determined based on a binary requirement that a clear line of sight exists between each point in the interest zone and each of object positions 402 and 408. Alternatively or in addition, interest zone 414 may be calculated with non-binary values to reflect that a clear line of sight exists between each point and one or more of the object positions. For example, a non-binary interest zone may include a region 414 from which both object positions 402 and 408 are visible, and regions 406 and 412 from which one of object positions 402 and 408 are visible. Although FIG. 4 illustrates an example involving two objects, in an embodiment, multiple viewshed analysis may be performed for any number of objects.

Figure 5:
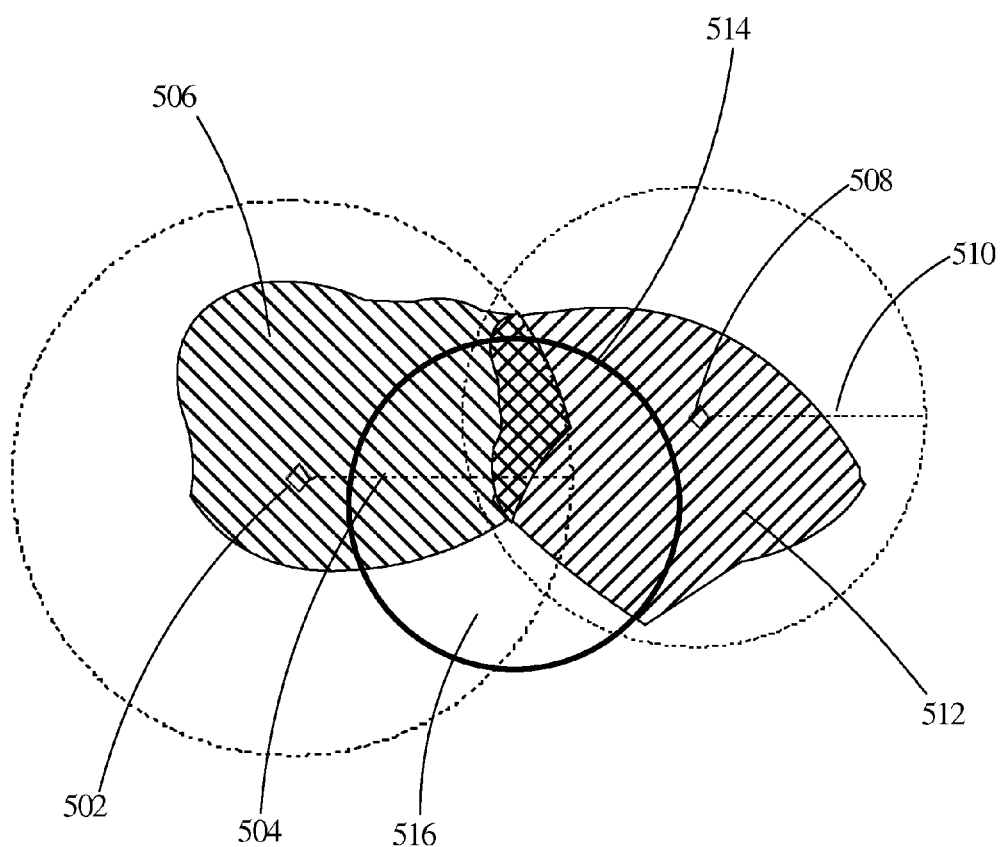
FIG. 5 illustrates an embodiment of an interest zone with no line of sight to multiple objects.

FIG. 5 illustrates an embodiment of an interest zone with no line of sight to multiple objects. In one embodiment, the interest zone is defined such that no line of sight is clear between the interest zone and any of the object positions within the associated ranges.

Two objects are located within relevant area 514. The first object is associated with object position 502 and range 504. The second object is associated with object position 508 and range 510. Viewshed 506 is a viewshed associated with the first object and includes all points with a clear line of sight from object position 502 within range 504. Viewshed 512 is a viewshed associated with the second object and includes all points with a clear line of sight from object position 508 within range 510.

Interest zone 516 includes all points in relevant area 514 with no line of sight to any specified object. Viewshed 506 and viewshed 512 may be calculated separately before non-overlapping regions are determined. Alternatively or in addition, when the interest zone 516 requires lack of visibility from any object, calculation may be restricted to points in interest zone 516 within an object position's range that lie outside of any viewshed previously calculated.

In one embodiment, interest zone 516 is calculated based on a binary value for visibility. When a binary value for visibility is used, the line of sight between a first point and a second point is either visible or not. A binary value for visibility may be appropriate for visibility and/or imaging in the visible light spectrum or near-visible light spectrum. Visibility may also be represented using probabilistic values, such as when evaluating the visibility of longer electromagnetic waves such as radio waves.

In one embodiment, interest zone 516 is determined based on a binary requirement that no line of sight exists between each point in the interest zone and each of object positions 502 and 508. Alternatively or in addition, interest zone 516 may be calculated with non-binary values to reflect that no clear line of sight exists between each point and one or more of the object positions. For example, a non-binary interest zone may include a region 516 from which none of object positions 502 and 508 are visible, and regions within interest zone 516 from which one of object positions 502 and 508 are visible.

Figure 6:
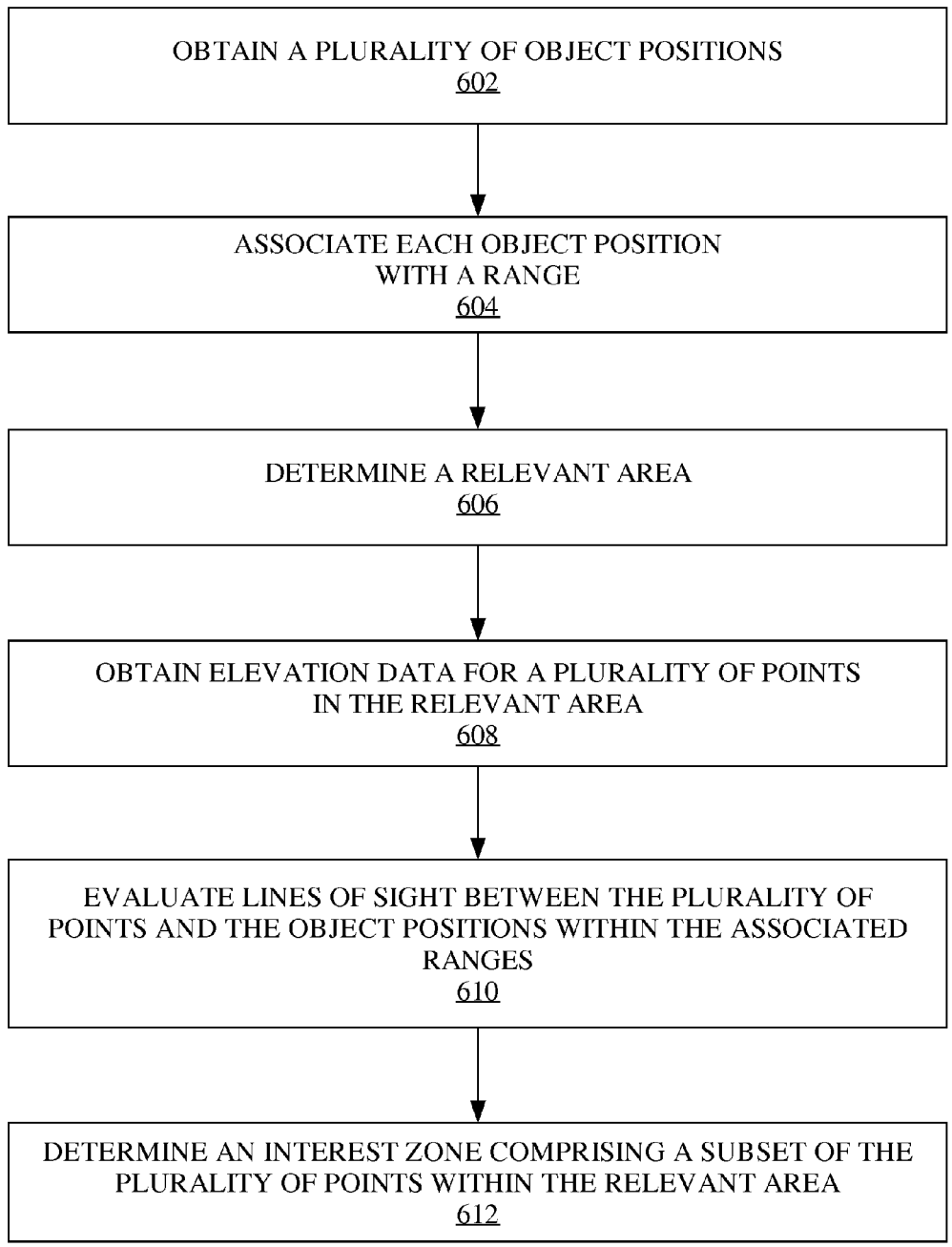
FIG. 6 is a flow diagram that illustrates an embodiment of a method for determining an interest zone based on multiple viewsheds.

FIG. 6 is a flow diagram that illustrates an embodiment of a method for determining an interest zone based on multiple viewsheds. Such a method may be performed by one or more computing devices configured as general-purpose computers or special-purpose computers, and using one or more computer programs or other software elements which when executed cause performing the operations shown in FIG. 6. For example, one or more steps of the method may be performed by computer system 1000 as further described herein. These operations involve storing, retrieving, and transforming data values in electronic digital memory with the effect of transforming the physical state of the memory according to the operations that are described. Further, the operations of FIG. 6 presume that a dataset representing a map, or other geographic data, is available for use in determining areas, ranges, and other values.

In block 602, a plurality of object positions is obtained. Object positions may be obtained from any data source, such as a database, file, data stream, or any other source of object data. In one embodiment, object information is entered by a user via a user interface. The object positions may be geographic coordinates defined in a geographic coordinate system. In one embodiment, at least one of the object positions corresponds to the location of an event.

In block 604, each object position is associated with a range. In one embodiment, the range is defined by a radius from the object position. The range may also be specified by one or more other formulas, curves, polygons, lines, edges, or any other method suitable for defining a range of the object position. In one embodiment, the range is determined based on an object type. A default value for the range may be determined based on the object type. Alternatively or in addition, the range may be determined and/or modified based on one or more local conditions, such as weather, pollution, humidity, and/or any local condition that may affect visibility. In one embodiment, the default value for the range is the boundary of the relevant area over which multiple viewshed analysis is performed.

In block 606, a relevant area is determined. The relevant area may include every point within the range of one or more object positions. Alternatively or in addition, the relevant area may include points outside the range of any object position. The relevant area may also exclude points within the range of any object position.

In block 608, elevation data is obtained for a plurality of points in the relevant area. In one embodiment, the plurality of points is selected based on a desired granularity. The granularity may be adjusted based on the granularity of the available elevation data. In one embodiment, the granularity is adjusted based on computational complexity and/or available computing resources. Alternatively or in addition, the available elevation data may be processed to adjust the granularity of the available elevation data. For example, the available elevation data may be downscaled using one or more mathematical methods to adjust the granularity. Different granularity may be used for different regions within the relevant area.

In one embodiment, the elevation data reflects terrain features and man-made features. Elevation data may be obtained from one or more databases. The elevation data stored in the one or more databases may be combined and/or otherwise modified to include one or more terrain and/or man-made features.

In block 610, lines of sight are evaluated between the plurality of points and the object positions within the associated ranges based on elevation data. In one embodiment, one or more viewsheds are calculated separately. Alternatively or in addition, calculation may be restricted to eliminate recalculation over a region already eliminated from a desired result. For example, when the desired result requires visibility from all object positions, calculation may be restricted to points within range of all object positions. For example, when the desired result requires visibility from all object positions, calculation may be restricted to points within range of all object positions. Alternatively, when the desired result requires lack of visibility from any object, calculation may be restricted to points within an object position's range that lie outside of any viewshed previously calculated.

In block 612, an interest zone is determined. The interest zone comprises a subset of the plurality of points within the relevant area. In one embodiment, the interest zone is calculated based on a binary value for visibility. Alternatively or in addition, visibility may be represented using probabilistic values.

In one embodiment, the interest zone includes points with a clear line of sight to multiple objects. The interest zone may be determined based on a binary requirement that a clear line of sight exists between each point in the interest zone and each object position. Alternatively or in addition, the interest zone may be calculated with non-binary values to reflect that a clear line of sight exists between each point and one or more of the object positions.

In one embodiment, the interest zone includes points with no line of sight to multiple objects. The interest zone may be determined based on a binary requirement that no line of sight exists between each point in the interest zone and any object position. Alternatively or in addition, the interest zone may be calculated with non-binary values to reflect that no clear line of sight exists between each point and one or more of the object positions.

5. Visualization

Computer-implemented systems and methods are also provided relating to user interfaces for performing multiple viewshed analysis and viewing multiple viewshed analysis results. Mapping tools may also be provided to facilitate multiple viewshed analysis. Visualization of the interest zone resulting from multiple viewshed analysis may be performed by one or more computing devices configured as general-purpose computers or special-purpose computers, and using one or more computer programs or other software elements which when executed cause performing the operations shown in FIG. 7. For example, one or more steps of the method may be performed by computer system 1000 as further described herein. These operations involve storing, retrieving, and transforming data values in electronic digital memory with the effect of transforming the physical state of the memory, and causing driving a computer display unit or video memory to a different state or appearance, according to the operations that are described.

Figure 7:
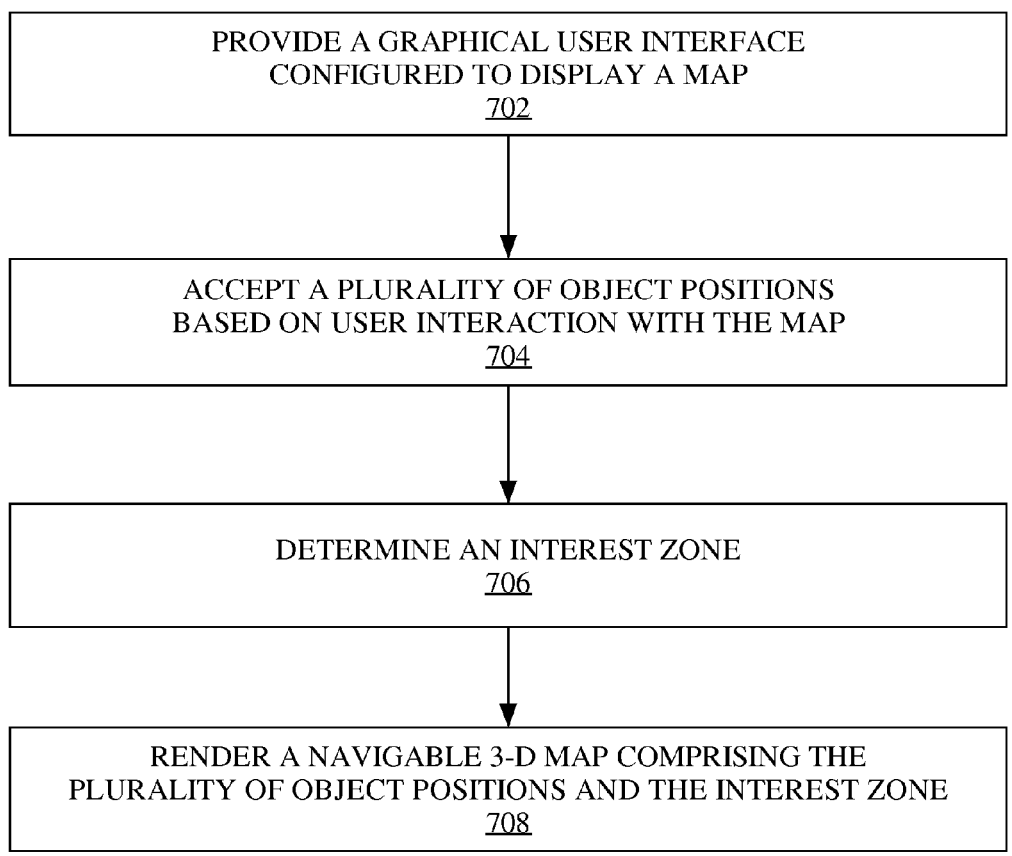
FIG. 7 is a flow diagram that illustrates an embodiment of a method for rendering an interest zone based on multiple viewsheds.

FIG. 7 is a flow diagram that illustrates an embodiment of a method for rendering an interest zone based on multiple viewsheds. Such a method may be performed by one or more computing devices. For example, one or more steps of the method may be performed by computer system 1000.

In block 702, a graphical user interface is provided. The graphical user interface is configured to display a map. In one embodiment, a map containing a relevant area for multiple viewshed analysis is displayed.

In block 704, a plurality of object positions is accepted based on user interaction with the map. In one embodiment a user interface configured to create objects and/or modify object properties is displayed after a location is selected on the map. The object may be associated with a geographic coordinate corresponding to the selected location.

In block 706, an interest zone is determined. For example, the interest zone may be determined in accordance with the method described in FIG. 6. The interest zone comprises a subset of the plurality of points within the relevant area. In one embodiment, the interest zone includes points with a clear line of sight to multiple objects. Alternatively, the interest zone includes points with no line of sight to multiple objects.

Figure 9:
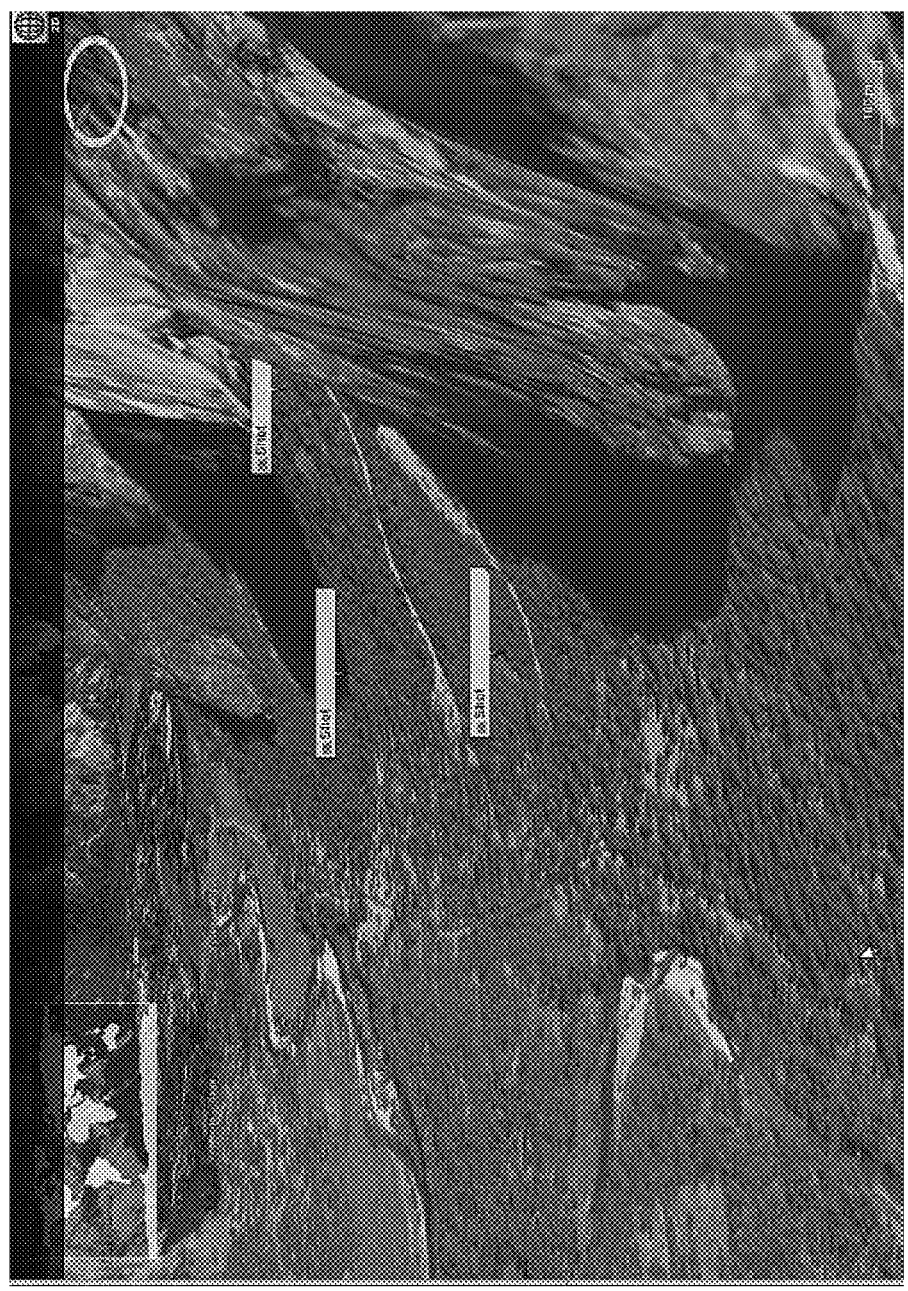
FIG. 9 illustrates an embodiment of a graphical user interface for rendering a navigable three-dimensional map of multiple viewshed analysis data.

In block 708, a navigable three-dimensional map is rendered. The navigable three-dimensional map comprises the plurality of object positions and the interest zone. An example of a navigable three-dimensional map comprising the plurality of object positions and the interest zone is shown in FIG. 9. In some embodiments, the operations of block 702, block 708 may be performed in coordination with another program, process or system that generates, displays, renders or causes generating, displaying or rendering a map. Thus, embodiments of FIG. 7 may be implemented in programs, processes or systems that do not directly perform graphics, mapping or display functions but that receive a plurality of object position data, determine an interest zone, and provide output interest zone data that other programs, processes or systems can use in map displays or other graphical displays.

Figure 8:
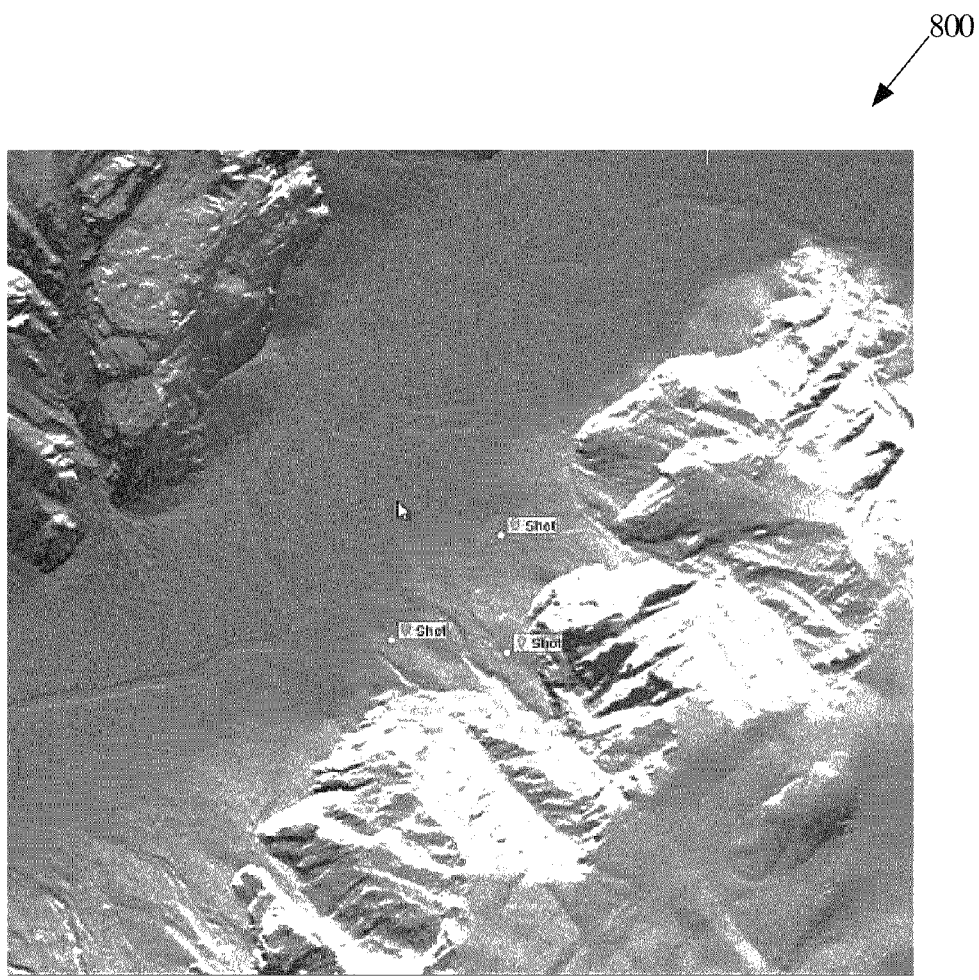
FIG. 8 illustrates an embodiment of a graphical user interface for multiple viewshed analysis.

FIG. 8 illustrates an embodiment of a graphical user interface for multiple viewshed analysis. Map display 800 illustrates an interest zone generated based on multiple viewshed analysis for three objects corresponding to attack events. The interest zone in FIG. 8 corresponds to points with a clear line of sight to each of the three objects. The interest zone is rendered on a map of the relevant area. Specifically, the highlighted region indicates all points with a clear line of sight to each object position associated with the three objects.

A three-dimensional navigable map may be rendered to display the interest zone in the context of the elevation data. FIG. 9 illustrates an embodiment of a graphical user interface for rendering a navigable three-dimensional map of multiple viewshed analysis data. Navigable map interface 900 generates a three-dimensional rendering of the interest zone and the relevant area based on map data and elevation data. Specifically, the highlighted region indicates all points of the clear line of sight to each object position associated with the three objects. In one embodiment, data associated with each object may be viewed within navigable map interface 900. The image is rendered based on the elevation data. Additional elevation data may be obtained from one or more databases to render the navigable three-dimensional map.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
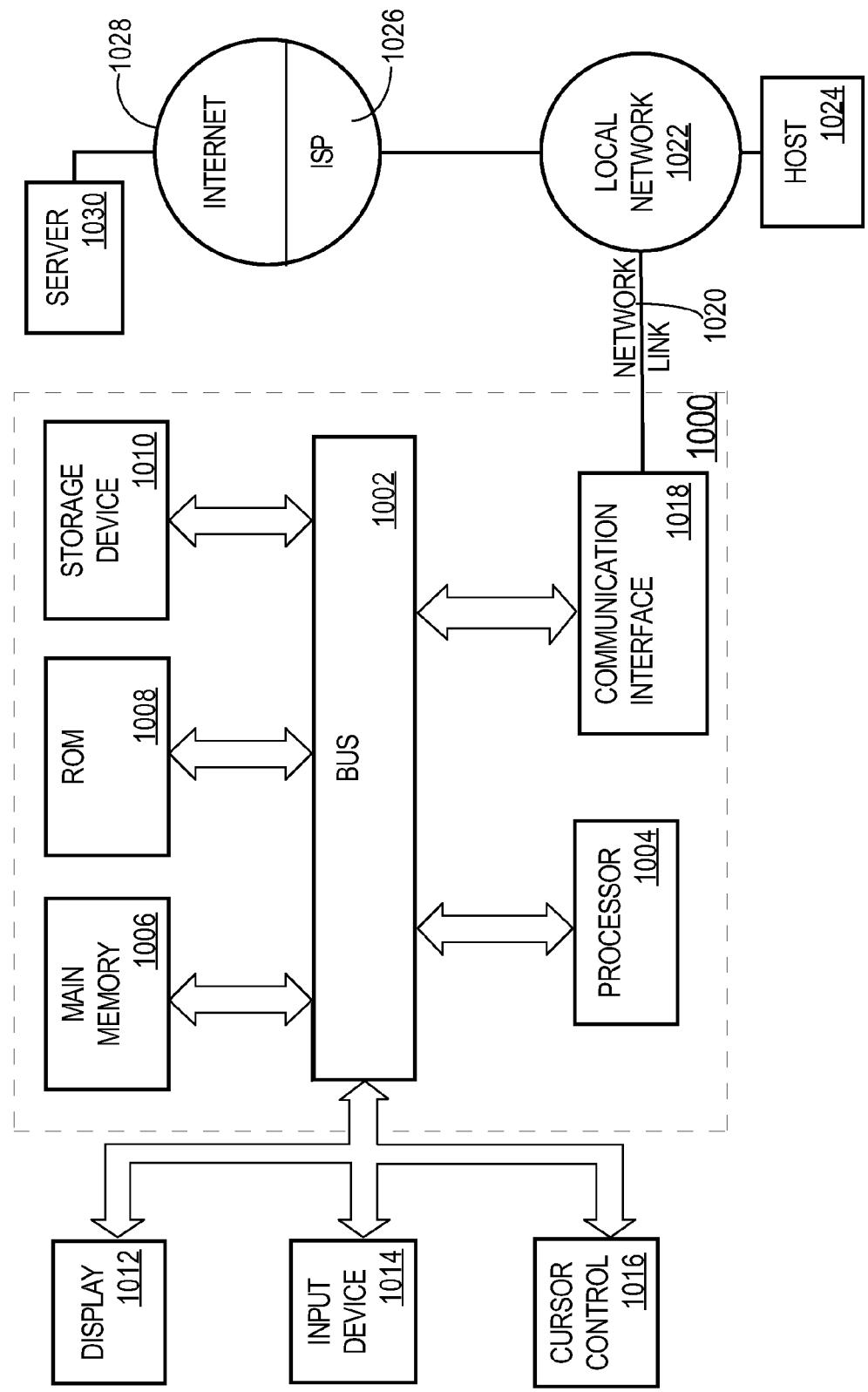
FIG. 10 illustrates a computer system upon which one or more embodiments may be implemented.

For example, FIG. 10 illustrates a computer system upon which one or more embodiments may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
obtaining, from a first data source, a plurality of locations of events, wherein the events are a plurality of attack events;
associating the plurality of locations of the events with one or more associated ranges;
determining a relevant area within the one or more associated ranges of the plurality of locations of the events;
obtaining, from a second data source, elevation data for a plurality of points in the relevant area;
calculating, by one or more processors, an intersection of a plurality of viewsheds from the plurality of locations of the events based on the one or more associated ranges and the elevation data;
determining, based on said calculating, an interest zone within the relevant area, wherein the interest zone comprises a position of a source of the plurality of attack events;
wherein the method is performed by one or more computing devices.

2. The method of claim 1, further comprising the steps of:
providing a graphical user interface configured to display a map;
accepting the plurality of locations of the events based on user interaction with the map.

3. The method of claim 1, further comprising the step of rendering a navigable three-dimensional map comprising the plurality of locations of the events and the position of the source of the plurality of attack events.

4. The method of claim 1, wherein the elevation data comprises terrain features and man-made features.

5. The method of claim 1, wherein at least one of the plurality of locations of the events corresponds to a location of a photograph.

6. The method of claim 1, wherein the plurality of attack events comprise one or more improvised explosive device (IED) detonations.

7. The method of claim 1, wherein the plurality of locations of the events are associated with an elevation, wherein calculating the intersection of the plurality of viewsheds is further based on the elevation.

8. The method of claim 1, wherein the position of the source of the plurality of attack events is a sniper location.

9. The method of claim 1, wherein the position of the source of the plurality of attack events is a lookout point.

10. The method of claim 1, wherein the plurality of attack events comprise one or more sniper attacks.

11. A non-transitory computer-readable medium carrying one or more sequences of instructions which, when executed by one or more processors, cause one or more processors to carry out the steps of:
obtaining, from a first data source, a plurality of locations of events, wherein the events are a plurality of attack events;
associating the plurality of locations of the events with a range;
determining a relevant area within the associated ranges of the plurality of locations of the events;
obtaining, from a second data source, elevation data for a plurality of points in the relevant area;
calculating, by one or more processors, an intersection of a plurality of viewsheds from the plurality of locations of the events based on the one or more associated ranges and the elevation data;
determining, based on said evaluating, an interest zone within the relevant area, wherein the interest zone comprises a position of a source of the plurality of attack events.

12. The non-transitory computer-readable medium of claim 11, wherein the one or more sequences of instructions further cause the one or more processors to carry out the steps of:
providing a graphical user interface configured to display a map;
accepting the plurality of locations of the events based on user interaction with the map.

13. The non-transitory computer-readable medium of claim 11, wherein the one or more sequences of instructions further cause the one or more processors to carry out the step of rendering a navigable three-dimensional map comprising the plurality of locations of the events and the position of the source of the plurality of attack events.

14. The non-transitory computer-readable medium of claim 11, wherein the elevation data comprises terrain features and man-made features.

15. The non-transitory computer-readable medium of claim 11 wherein at least one of the plurality of locations of the events corresponds to a location of a photograph.

16. The non-transitory computer-readable medium of claim 11, wherein the plurality of attack events comprise one or more improvised explosive device (IED) detonations.

17. The non-transitory computer-readable medium of claim 11, wherein the plurality of locations of the events are associated with an elevation, wherein calculating the intersection of the plurality of viewsheds is further based on the elevation.

18. The non-transitory computer-readable medium of claim 11, wherein the position of the source of the plurality of attack events is a sniper location.

19. The non-transitory computer-readable medium of claim 11, wherein the position of the source of the plurality of attack events is a lookout point.

20. The non-transitory computer-readable medium of claim 11, wherein the plurality of attack events comprise one or more sniper attacks.

* * * * *